United States Patent Office 2,770,787
Patented Nov. 13, 1956

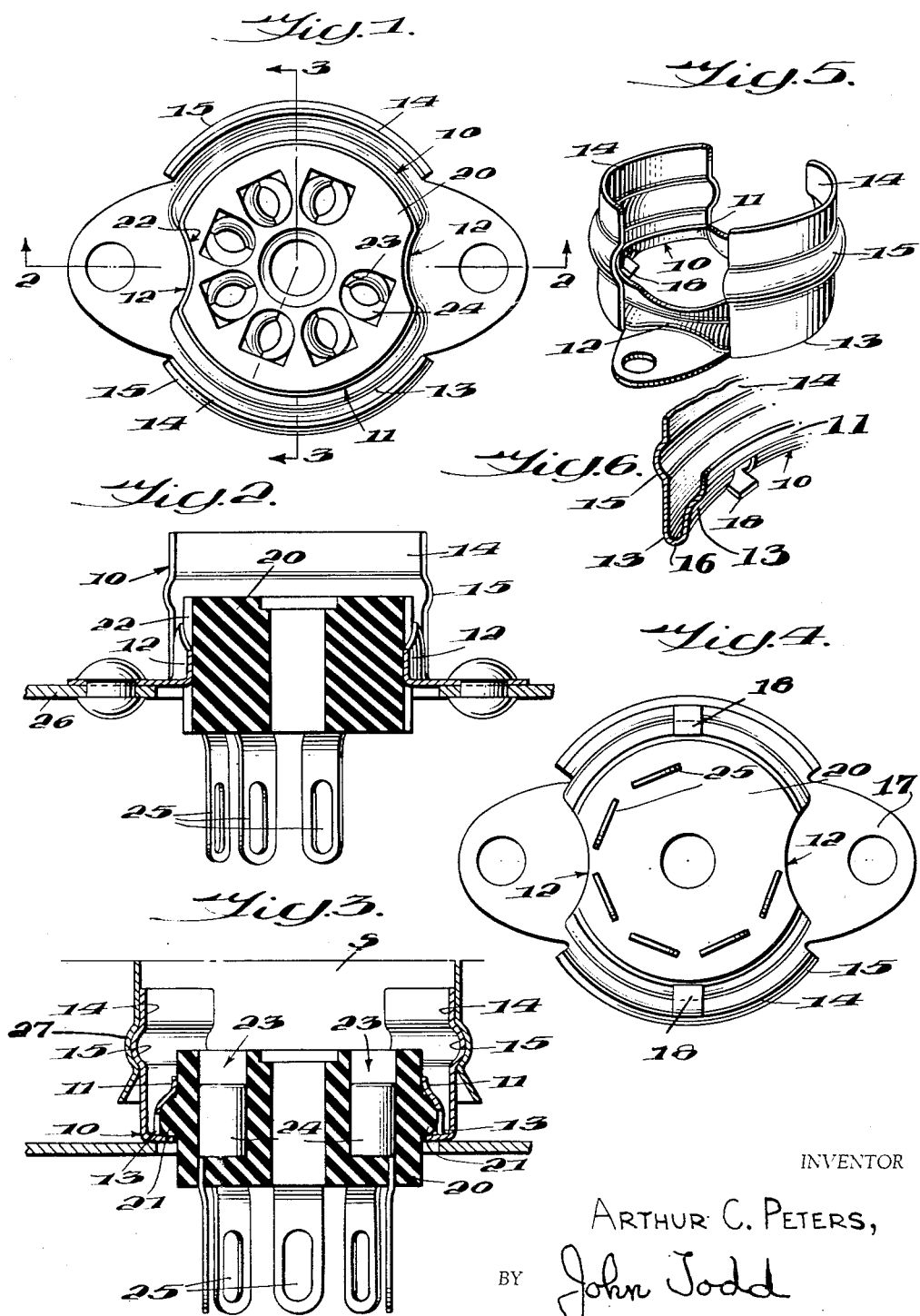

2,770,787

SOCKET MOUNTING BASE FOR TUBE SHIELD

Arthur C. Peters, Midlothian, Ill., assignor to Cinch Manufacturing Corporation, Chicago, Ill., a corporation of Illinois Application August 21, 1952, Serial No. 305,604

2 Claims. (Cl. 339—143)

The present invention relates to a tube socket mounting member and shield support for mounting the tube sockets of thermionic and like prong electronic tubes upon a chassis or support while providing a snap fastener support for a tube shield, permitting the tube shield to be grounded to the chassis through the mounting members, and the invention aims generally to improve existing devices of this type.

Heretofore, combined socket mountings and shield supports for this purpose have consisted of a metal member providing a horizontally disposed ring portion adapted to engage and support the under edge of an annular bead of a tube socket, the member being provided with outwardly extending attaching ears in the plane of the ring for attachment to the chassis or support. Such mounting members were provided with upstanding arcuate flanges intermediate the attaching ears adapted for snap fastening engagement with the open end of a tube shield. In order that the flanges may be sufficiently stiff, yet resilient, to effect proper snap fastening engagement with the tube shield, it has been customary to heat-treat the mounting members to increase the stiffness of the flanges.

The present invention aims to improve the existing socket mountings above described by providing an improved construction in which the upstanding arcuate shield-engaging flanges are connected to a socket-embracing ring in such a manner that the flanges will have sufficient stiffness and resiliency for proper snap fastening engagement with the open end of a tube shield without the necessity of heat-treating the mounting members.

A further object of the invention is the provision of a socket mounting and shield support which will embrace and support a tube socket more securely than existing mountings of the above described type.

The above and other objects of the invention will be apparent to persons skilled in the art to which the invention pertains from a consideration of the accompanying drawings and annexed specification illustrating and describing a preferred embodiment of the invention.

In the drawings:

Fig. 1 is an enlarged plan view of a thermionic tube socket and socket mounting and shield-supporting member according to the invention;

Fig. 2 is an enlarged vertical sectional view thereof as taken on the line 2—2 of Fig. 1, a fragmentary portion of a tube shield being illustrated as applied to the mounting member;

Fig. 3 is a fragmental sectional view of the socket and mounting member as taken on the line 3—3 of Fig. 1;

Fig. 4 is a bottom plan view of the socket and mounting member shown in Fig. 1;

Fig. 5 is a perspective view of the mounting member; and

Fig. 6 is a fragmental perspective sectional view of a portion of the mounting member.

Referring to the drawings, the improved socket mounting and shield support of the present invention comprises a metal mounting member 10 adapted to embrace and support a prong-receiving socket member 20 adapted to receive the terminal prongs of a thermionic or like tube (not shown) as is well understood in the art.

The tube socket 20 may be of any conventional design comprising a generally cylindrical body of insulating material having an annular peripheral bead 21 intermediate its upper and lower faces and opposed arcuate recesses 22 adapted to receive arcuate portions of the mounting member so that the socket may be non-rotatably received by the mounting member. The socket member 20 is also provided with the customary circular series of contact-receiving bores 23 housing the tube prong-receiving contacts 24, the terminal ends 25 of which extend outwardly through and beyond the bottom faces of the socket member as is usual.

The improved socket mounting and shield supporting member 10 of the invention comprises a ring portion 11 providing a generally vertical wall adapted to receive and fit the peripheral wall of the socket 20 above the bead 21. The ring member 11 is provided with diametrically opposed indented arcuate portions 12 adapted to fit in the socket recesses 22 to prevent relative turning of the socket and mounting member. The lower portion of the ring portion 11 is outwardly and downwardly flanged as at 13, see Figs. 3 and 5, to provide a seat for the upper portion of the socket bead 21, which may be inserted in the mounting member 10 through the lower open end thereof.

The mounting member or retainer 10 is provided with a plurality of resilient tube shield-supporting wings 14 adapted for snap fastener engagement with a generally cylindrical tube shield S as a result of a simple axial movement of the shield over the wings. The wings 14 may be of any number desired and circularly arranged, and as illustrated, may comprise two opposed arcuate wings each of approximately 120 degrees extent. The wings 14 are provided with an outwardly extending arcuate bead 15 adapted to be engaged in an annular beaded seat 27 adjacent the lower end of the tube shield S when the latter is slipped over the wings and is pressed downwardly into a position in which the lower edge of the outwardly flared lower end of the shield engages the mounting member and grounds the shield to the chassis.

As will be observed from Figs. 3 and 5, the upstanding wings 14 are joined to the downwardly extending rim of the seat 13 of the ring portion 11 by a reverse or U-shaped bend or bight portion 16. This construction provides the right amount of stiffness and resiliency to effect a good snap fastener action between the wings and tube shield without requiring the mounting member to be heat-treated for stiffness.

The mounting member is provided with opposed apertured ears 17 integral with and extending laterally from the ring portion 11 between the wings 14 adapted to be attached to the support or chassis 26 by means of rivets or the like as is customary in the art.

The mounting member is provided with means for engaging the underside of the bead 21 for retaining the socket in assembly with the ring portion 11. Such means advantageously may be in the form of a tongue 18, cut from the outwardly and downwardly flanged portions 13 and normally extending downwardly in continuation of the wall of the wings 14. After the socket 20 has been inserted in the ring portion 11 and the bead 21 seated against the flanged portion 13, the tongues 18 are bent inwardly to engage the under side of the bead 21.

As will be apparent, the tube socket 20 may be assembled in the ring portion 11 of the mounting member as above described. The vertical walled ring portion 11 embraces the peripheral wall of the socket holding it securely and non-rotatably. When the mounting member 10 is attached to a support or chassis 26 by means of the ears 17 and a tube shield S is fitted over the wings 14, the tube shield will be grounded to the chassis.

By reason of the U-shaped bight portion 16 connecting the wings 14 and flanged portion 13, the wings are rendered sufficiently stiff to provide a proper snap fastener action and grounding contact even after repeated separations and without heat-treating the mounting member.

Although I have illustrated and described one illustrative embodiment of the invention, I do not intend to be limited thereby as the scope of the invention is best defined in the appended claims.

I claim:

1. A tube socket mounting member and shield support comprising a central ring-like vertical wall portion, said wall portion having a flanged seat portion for receiving and supporting a tube socket, and a plurality of vertical wing members arranged laterally exteriorly of said wall portion, said wing members being disposed in spaced, substantially parallel relation to said wall portion and extending above the same, and provided with frictional engaging means to receive and retain a tube shield, said wing members being connected at their bottom edges thereof to the bottom edge of said wall portion by a resilient U-shaped bight portion, said bight portion lying in a vertical plane.

2. The structure of claim 1 in which said mounting member has a tongue element integral with said bight portion, said tongue element extending inwardly of said ring-like wall portion and disposed in spaced relation to said flanged seat portion for receiving a tube socket between them.

References Cited in the file of this patent

UNITED STATES PATENTS

| | | |
|---|---|---|
| 2,080,913 | Hafecost | May 18, 1937 |
| 2,248,399 | Watts | July 8, 1941 |
| 2,358,491 | Del Camp | Sept. 19, 1944 |
| 2,499,612 | Staver | Mar. 7, 1950 |
| 2,585,887 | Woodward | Feb. 12, 1952 |

FOREIGN PATENTS

| | | |
|---|---|---|
| 480,744 | Great Britain | Feb. 28, 1938 |
| 578,391 | Great Britain | June 26, 1946 |